US012367522B2

(12) United States Patent
Surury

(10) Patent No.: US 12,367,522 B2
(45) Date of Patent: Jul. 22, 2025

(54) GIFT TRANSACTION SYSTEM AND METHOD FOR CREATING A CUSTOM-MADE DIGITAL MALL OF GIFTS

(71) Applicant: Gulnar Surury, Mumbai (IN)

(72) Inventor: Gulnar Surury, Mumbai (IN)

( * ) Notice: Subject to any disclaimer, the term of this patent is extended or adjusted under 35 U.S.C. 154(b) by 198 days.

(21) Appl. No.: 18/213,895

(22) Filed: Jun. 26, 2023

(65) Prior Publication Data

US 2024/0013286 A1  Jan. 11, 2024

(30) Foreign Application Priority Data

Jul. 8, 2022 (IN) .............................. 202221039453

(51) Int. Cl.
*G06Q 30/0601* (2023.01)
*G06Q 20/38* (2012.01)
*H04L 51/046* (2022.01)

(52) U.S. Cl.
CPC ....... *G06Q 30/0637* (2013.01); *G06Q 20/385* (2013.01); *G06Q 30/0641* (2013.01); *H04L 51/046* (2013.01)

(58) Field of Classification Search
CPC .............. G06Q 50/01; G06Q 30/0603; G06Q 30/0613; G06Q 30/0641; G06Q 30/0643; G06Q 30/0633; G06Q 30/0635; G06Q 30/0637; G06Q 30/0623
USPC ......... 705/27.1–27.2, 26.1, 26.35, 26.61–64, 705/26.8, 26.81
See application file for complete search history.

(56) References Cited

U.S. PATENT DOCUMENTS

| | | | |
|---|---|---|---|
| 9,773,273 B2 | 9/2017 | Erez et al. | |
| 11,170,430 B1 | 11/2021 | Richards | |
| 2005/0091120 A1 | 4/2005 | Auletta | |
| 2010/0082449 A1* | 4/2010 | Plautz | G06Q 30/0601 705/26.1 |
| 2013/0073421 A1* | 3/2013 | Poisson | G06Q 30/02 705/26.7 |
| 2013/0332308 A1 | 12/2013 | Linden et al. | |
| 2016/0232480 A1* | 8/2016 | Erez | G06Q 10/087 |
| 2022/0198036 A1* | 6/2022 | Bayat | G06Q 20/385 |

OTHER PUBLICATIONS

Gift Cards—An Exciting New Way to Gift Online | Woohoo.in.
Unique Corporate Gifts and Promotional Products Manufacturer in India | BrandSTIK.
Corporate Gifting Platform—GiftNow.

* cited by examiner

*Primary Examiner* — Jeffrey A. Smith
(74) *Attorney, Agent, or Firm* — SOROKER AGMON NORDMAN RIBA

(57) ABSTRACT

A gift transaction system and method to enable a gift-giver to provide a gift-receiver with a range of brands and categories across multiple vendors to choose from. The gift transaction system creates a gift board for the gift-receiver based on the information provided by the gift-giver. The gift board integrates an array of products, services, and lifestyle items manually selected by the gift-giver from multiple vendors. The gift transaction system digitally transmits the gift board to the gift receiver. The gift-receiver can hop from vendor site to vendor site with each click on the gift board and make selections, and create a shortlist on a toolbar provided on the digital page. Once the gift-receiver places his/her finalized gift order, the gift transaction system executes the order, and pays the vendors—and upon completion, the gift-receiver will be notified of the delivery.

10 Claims, 25 Drawing Sheets

Gift Board

| rolling brand logos | rolling brand logos | rolling brand logos | rolling brands |

402

Welcome to Gift Board

Your name *  _____
Your email *  _____
Your mobile no. *  _____
Verify with OTP *  _____
Create Password *  _____

Male / Female  _____  Age  _____

Sign in with  Social media site 1  Social media site 2

* Required fields

GIFT TRANSACTION SYSTEM AND METHOD FOR CREATING A CUSTOM-MADE DIGITAL MALL OF GIFTS

TECHNICAL FIELD

The present invention relates to a gift transaction system, in particular to a gift transaction system and method that enable a gift-giver to provide a gift-receiver with a range of brands and categories across multiple vendors to choose from.

BACKGROUND

Generally, selecting the right gift for a friend or loved one is often a difficult and time-consuming process. A poor choice often leads to disappointment on the part of the gift recipient. Currently, there are various products, websites, and solutions that exist to solve the above problem such as US patent application number US20130073421A1 filed by Poisson John discloses a custom-made catalog of gifts for an intended gift recipient. The gift-giving method of this patent application includes receiving a characteristic of an intended gift recipient and a gift amount and generating a custom catalog of gifts that includes gift items selected based at least in part on the characteristic and the gift amount.

Further, US patent U.S. Pat. No. 9,773,273B2 issued to Erez Roy et al. discloses a system architecture of a gift transaction system. The gift transaction system includes a buyer interface module, a recipient interface module, a merchant backend interface module, a storefront interface module, a curation module, a reminder module, an analytics module, or a media plug-in interface module. Specifically, the media plug-in interface module can include a set of application programming interfaces (APIs) that provides an external connection with third-party content providers, applications, and websites. The buyer interface module is for providing a buyer interface to personalize a gift package. The recipient interface module is for providing a recipient interface to customize the gift package. The storefront interface module and the media plug-in interface module are for integrating the buyer interface and the recipient interface with merchant websites or third-party websites, such as social media websites. The curation module is for determining product suggestions for either the buyer or the recipient. The reminder module is for maintaining customer loyalty by reminding previous users to come back to the gift transaction system by reminding them of gift-giving opportunities, such as holidays, birthdays, anniversaries, or other social events. The analytics module is for building a business intelligence database to support at least the curation module or the reminder module.

However, the existing solutions can only enable the gift-giver to make a best-guess effort in choosing a gift for the gift-receiver. Optionally, the gift-giver may pick a gift card that offers their recipient some flexibility. That flexibility however is restricted. Gift cards are merchant-specific. The gift cards often leave the gift-receiver dissatisfied because, unless the total of their selected items exactly coincides with the gift amount—which is not often—the gift-receivers are caught in a predicament. If the total is less, the gift-receivers must either let the balance go to waste or be compelled to pick another item and spend out-of-pocket. In cases where the gift card balance is added to their wallet for future use—that wallet is also merchant-specific, so again, perforce, they are locked in.

Further, gift vouchers suffer from some of the same issues and are often a hassle to use—finding the right gift voucher for the right product, often with expiry deadlines, having to enter cumbersome codes, etc. The solutions to genuine choice are woefully insufficient, inelegant, and inconvenient to use. Thus, there is currently a dire gap in the market for gifting.

There is a need for an efficient and effective system and method that allow the gift-givers to create and curate their special aggregation for their gift-receiver and offer it on a personalized gift board. Further, there is a need for a system and method to create a digital mall for gifting that can provide a single platform where the gift-giver assembles and compiles all the gift possibilities for their gift-receiver. Out of which the gift-receiver can browse through the variety of categories, products, services, or experiences on offer, and arrive at a gift that is perfect for them.

SUMMARY OF THE INVENTION

The present invention mainly solves the technical problems existing in the prior art. In response to these problems, the present invention provides a gift transaction system and method for creating a gift board of gifts by a gift-giver and enabling a gift-receiver to select the gifts from the gift board.

An aspect of the present disclosure relates to a gift transaction method for creating a gift board of a plurality of gifts by a gift-giver and enabling a gift-receiver to select the gifts from the gift board. In an aspect, the gift board is a custom-made digital mall. The method includes a step of providing access to a digital page of a gifting platform through one or more computing devices. In an aspect, the digital page is a website page or mobile web pages such as a mobile application based on Android®, or iOS®. The method includes a step of presenting a home page of the gifting platform upon receiving credentials from the gift-giver and initiating a step of creating the gift board upon receiving a request touch gesture. The method includes a step of receiving the gift-receiver's data and a gift amount from the gift-giver upon receiving the request touch gesture. The method includes a step of presenting the plurality of gifts on the gifting platform. The gifts are associated with a plurality of brands and a plurality of categories across a plurality of vendors for gifting based on the received data about the gift-receiver. The method includes a step of enabling, by the one or more processors, the gift-giver to select one or more gifts from the plurality of gifts presented on the gifting platform. The method includes a step of adding the gifts to the gift board upon selection of the gifts by the gift-giver. The method includes a step of receiving approval from the gift-giver for the gifts added to the gift board. The method includes a step of receiving the contact information of the gift-receiver. The method includes a step of receiving the gift amount from the gift-giver through one or more payment modes and receiving a one-time passcode (OTP) to verify the payment. The method includes a step of providing access to the gift board created by the gift-giver to the gift-receiver upon receiving an alphanumeric code pertaining to the gift board received in the computing devices of the gift-receiver from an application server. The method includes a step of opening a vendor website of the brand selected by the gift-receiver in the gifting platform. The method includes a step of superimposing, by one or more processors, an icon on the vendor website inside the gifting platform. The icon presents a toolbar comprising a shortlist interface, a gift amount, and a back to my gift board interface. The shortlist interface displays the gifts selected by the gift-giver, and the back to my gift board interface enables the gift-giver to return to the gift board and continue the selection of the gifts from the gift board. The method includes a step of enabling the gift-receiver to place an order for the gifts displayed in the shortlist interface. The method includes a step of presenting an address page to receive the address information of the gift-receiver. The method includes a step of processing the order upon receiving the address information of the gift-receiver.

In an aspect, the gifts are added to the gift board with a unique alphanumeric identifier.

In an aspect, the gift-receiver is presented with the gift board with the unique alphanumeric identifier.

In an aspect, the computing devices of the gift-receiver receive the alphanumeric code through a plurality of messaging platforms such as WhatsApp, SMS, and email.

In an aspect, the gift-receiver module is configured to enable the gift-receiver to send a personal message to the gift-giver.

An aspect of the present disclosure relates to a gift transaction system that enables a gift-giver to provide a gift-receiver with a range of brands and categories across multiple vendors to choose from. The gift transaction system further enables the gift receiver to select the gift they like from the curated range of brands and categories—across multiple vendors. The gift transaction system onboards a widespread inventory of vendors in a variety of categories including products, services, and lifestyle experiences such as travel, restaurants, club memberships, etc. The gift transaction system creates a gift board for the gift-receiver based on the information provided by the gift-giver. The gift board integrates an array of products, services, and lifestyle items manually selected by the gift-giver from multiple vendors. The gift transaction system digitally transmits the gift board to the gift receiver as one compact imit. Each item on the gift board is a direct link to that vendor's portal. The gift-receiver can hop from vendor site to vendor site with each click on the gift board and make selections at their leisure and pace, creating a shortlist via a toolbar provided on the digital page. Once the gift-receiver places his/her finalized gift order, the gift transaction system executes the order, and pays the vendors—and upon completion, the gift receiver will be notified of the delivery. The gift transaction system aggregates vendors as well as online marketplaces, creating a custom-made digital mall by the gift-giver for the gift receiver. This makes the gifting experience unique because it is not item-centric but genre centric. The gift-giver and the gift receiver are free to shop at multiple vendor sites; but payment and gift order settlement for all of them is executed at a single portal i.e., the gifting platform, making the participation both flexible and seamless.

Accordingly, one advantage of the present invention is that it aggregates various vendors on the gifting platform for gifting and creates a personalized digital gift mall for the gift receiver.

Accordingly, one advantage of the present invention is that it acts as a gift compiler and streamlines the gifting process to help the gift-giver with accurate gifting.

Accordingly, one advantage of the present invention is that it enables the git-givers to curate the gifts and further enables the gift-receivers to select their gift.

Accordingly, one advantage of the present invention is that it is not individual-product-oriented but rather it is genre-oriented, which proliferates the choices in gifting Accordingly, one advantage of the present invention is that it provides hassle-free gifting for the gift-giver and gift-receiver.

Accordingly, one advantage of the present invention is that it aims to take the guesswork out of the gifting process where the gift-giver cannot go wrong in gifting.

Other features of embodiments of the present disclosure will be apparent from the accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 4 illustrates an example of a sign-up interface embedded in the gifting platform, in accordance with an embodiment of the present subject matter.

FIG. 24 illustrates an example of an address interface embedded in the gifting platform, in accordance with an embodiment of the present subject matter.

DETAILED DESCRIPTION OF THE ILLUSTRATIVE EMBODIMENTS

Figure 1:
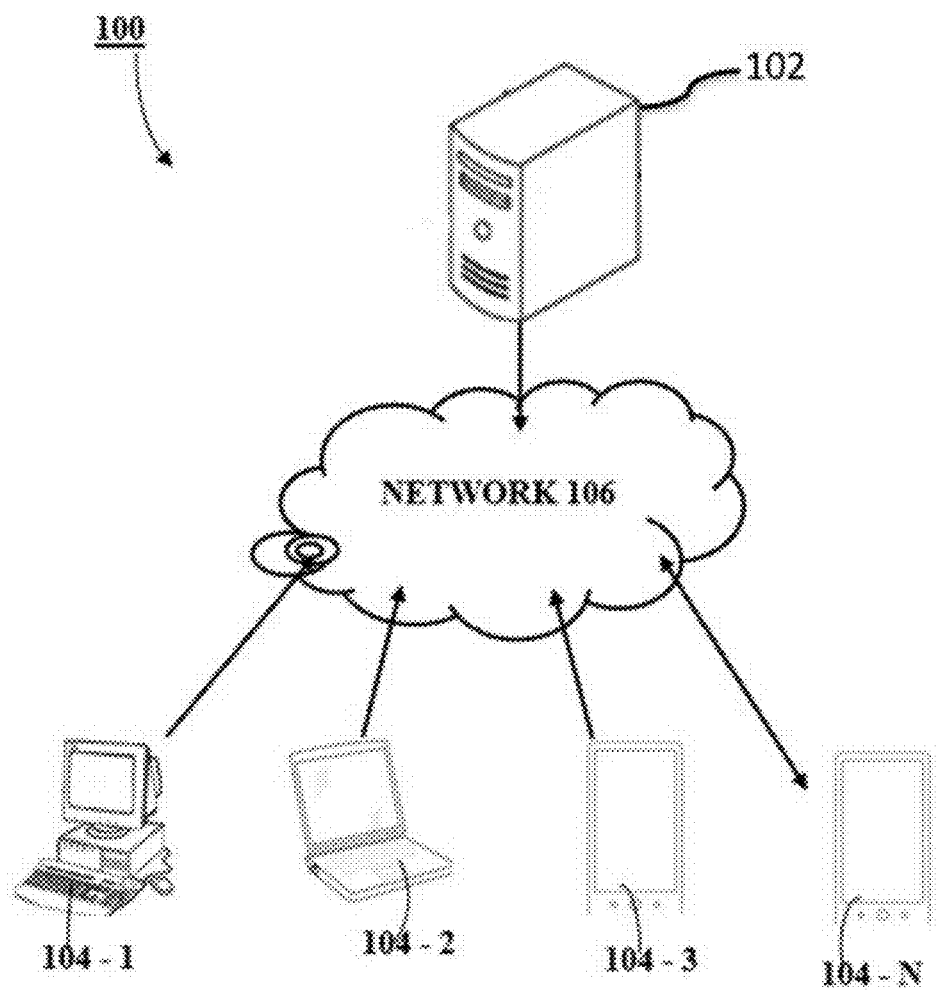
FIG. 1 illustrates a network implementation of a gift transaction system to create a gift board of a plurality of gifts by a gift-giver, and enable a gift-receiver to select the gifts from the gift board, in accordance with an embodiment of the present subject matter.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

Gift transaction Systems and methods are disclosed for creating a gift board (custom-made digital mall) of a plurality of gifts by a gift-giver, and enabling a gift-receiver to select the gifts from the gift board. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

The present invention discloses a gift transaction system and method whereby a digital mall is created by a gift-giver, from which the gift-receiver gets to select his/her gift. The gift transaction system facilitates the gift-giver to send a gift compendium to the gift-receiver to choose from. The gift transaction system provides a coalition of vendors on a single gift board and transmits a customized gift collection to the gift-receiver. Further, the gift transaction system and method allow the gift-giver to offer a choice to the gift-receiver, not the other way around. The gift-receiver gets to choose the product, the brand, and the outlet, so their satisfaction is guaranteed. Further, the gift transaction system allows the gift-givers to offer gift choices across multiple merchants and multiple platforms by creating a custom-built digital plaza specially curated for their gift-receivers. And the gift-receivers are free to roam around this vast arcade—not be tied to a specific site.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, memory, or memory devices.

FIG. 1 illustrates a network implementation of a gift transaction system 100 to create a gift board of a plurality of gifts by a gift-giver, and enable a gift-receiver to select the gifts from the gift board, in accordance with an embodiment of the present subject matter. Although the present subject matter is explained considering that the present gift transaction system 100 is implemented on an application server 102, it may be understood that the present gift transaction system 100 may also be implemented in a variety of computing systems, such as a laptop computer, a desktop computer, a notebook, a workstation, a mainframe computer, a server, Amazon elastic compute cloud (Amazon EC2), a network server, and the like. It will be understood that the present gift transaction system 100 may be accessed by multiple users through one or more computing devices 104-1, 104-2 . . . 104-N, collectively referred to as computing device 104 hereinafter, or applications residing on the computing device 104. Examples of the computing device 104 may include but are not limited to, a portable computer, a personal digital assistant, a handheld or mobile device, smart devices, workstations, smartphones, laptops, and tablets. The computing devices 104 are communicatively accessible to the present gift transaction system 100 through a network 106. In an embodiment, the gift-giver and the gift-receiver both have to use computing devices 104 to access the features of the gift transaction system 100.

In one implementation, network 106 may correspond to a communication medium through which the application server 102, and the one or more computing devices 104 may communicate with each other. Such communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The network 106 may include but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the application server 102 may refer to a computing device or a software framework hosting an application or a software service. In an embodiment, the application server 102 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 102 may be realized through various types of application servers such as, but are not limited to, a Java application server, a NET framework application server, a Base4 application server, a PHP framework application server, or any other application server framework. In an embodiment, the application server 102 may be realized as an application program installed on and/or running on one or more computing devices 104 without departing from the scope of the disclosure.

In operation, the gift-giver provides contact information of the gift-receiver and the gift amount. Then selects the categories and vendors from the inventory that pops up. The picks of the gift-givers are dropped on a gift board to create a gift mosaic, which is transmitted to the gift-receiver. The latter merely click on the sites of their preference, create a shortlist of gifts via the toolbar, and place their finalized order. The application program uses the vendor API to pay the vendor and the gift is delivered—like to any other customer. There is no complicated API integration required from the vendor—they only provide an API plugin to accept payments from our app—immediately, seamlessly, right at the point of purchase. It is a simple, streamlined, real-time process all the way through. The result is genuine flexibility and versatility, not a limited choice.

Figure 2:
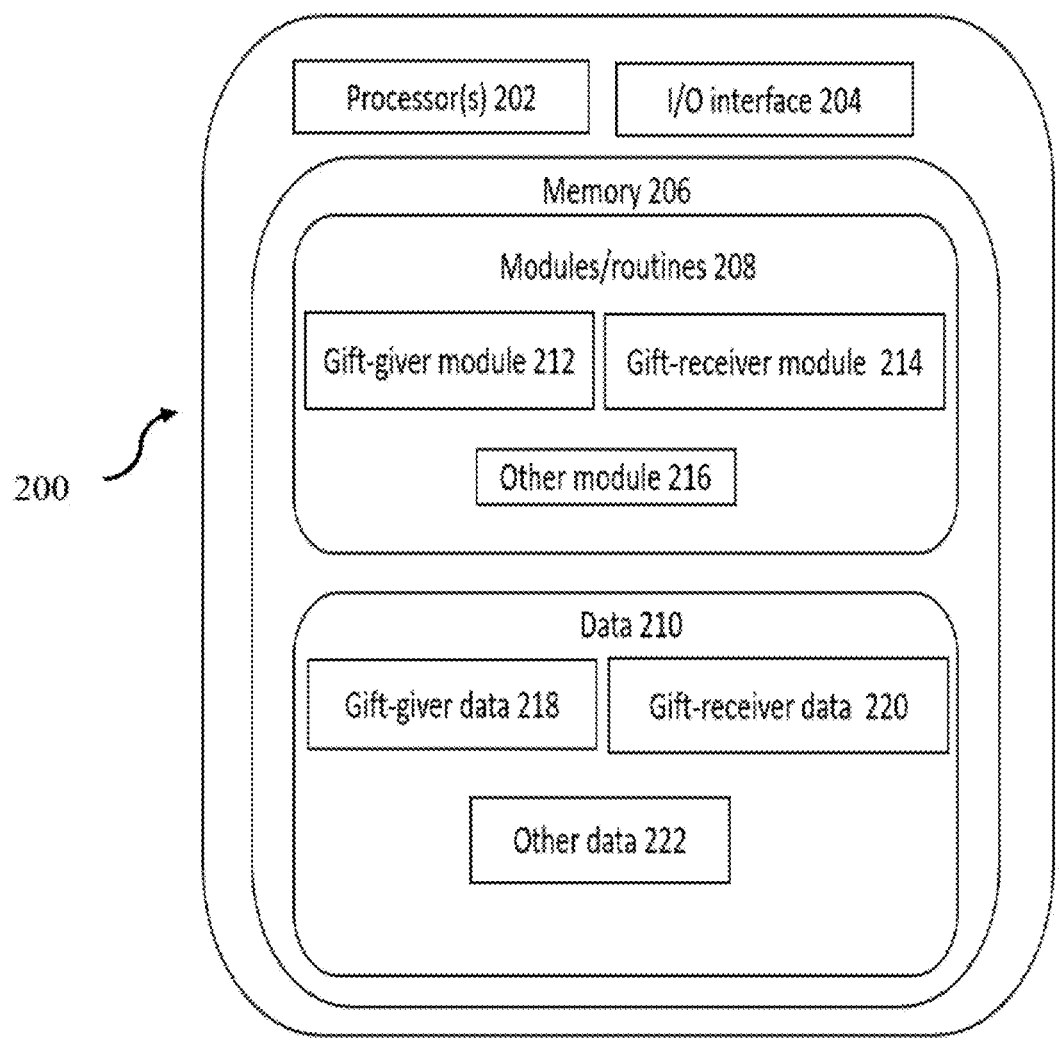
FIG. 2 illustrates a block diagram of various components of the gift transaction system, in accordance with an embodiment of the present subject matter.

FIG. 2 illustrates a block diagram 200 of various components of the gift transaction system, in accordance with an embodiment of the present subject matter. FIG. 2 is explained in conjunction with FIG. 1. The gift transaction system 100 may include at least one processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 is configured to fetch and execute computer-readable instructions stored in memory 206.

The I/O interface 204 may include a variety of software and hardware interfaces, for example, a web interface, a graphical user interface, and the like. The I/O interface 204 may allow the gift transaction system 100 to interact with a user directly or through computing unit 104. Further, the I/O interface 204 may enable the gift transaction system 100 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or nonvolatile memory, such as read-only memory (ROM), erasable programmable ROM, flash memories, hard disks, optical disks, and magnetic tapes. The memory 206 may include modules 208 and data 210.

The modules 208 includes routines, programs, objects, components, data structures, etc., which perform particular tasks or implement particular abstract data types. In one implementation, the modules 208 may include a gift-giver module 212, a gift-receiver module 214, and other module 216. The other modules 216 may include programs or coded instructions that supplement applications and functions of the gift transaction system 100.

The data 210, amongst other things, serves as a repository for storing data processed, received, and generated by one or more of the modules 208. The data 210 may also include gift-giver data 218, gift-receiver data, and other data 222. The other data 222 may include data generated as a result of the execution of one or more modules in the other module 216.

In one implementation, the gift-giver module 212 is configured to provide an access to a digital page of a gifting platform through one or more computing devices 104. The gift-giver module 212 is further configured to present a home page of the gifting platform upon receiving credentials from the gift-giver and initiate a step of creating the gift board upon receiving a request touch gesture. The gift-giver module 212 is configured to receive data of the gift-receiver and a gift amount from the gift-giver upon receiving the request touch gesture. The gift-giver module 212 is configured to present the plurality of gifts on the gifting platform. The gifts are associated with various brands and various categories across vendors for gifting based on the received data pertaining to the gift-receiver. The gift-giver module 212 is further configured to enable the gift-giver to select one or more gifts from the plurality of gifts presented on the gifting platform. The gift-giver module 212 is configured to add the gifts to the gift board upon selection of one or more gifts by the gift-giver; and receive approval from the gift-giver for the gifts added to the gift board. In an embodiment, the gifts are added to the gift board with a unique numeric identifier. The gift-giver module 212 is configured to receive the contact information of the gift-receiver. Furthermore, the gift-giver module 212 is configured to receive the gift amount from the gift-giver through one or more payment modes and receive a one-time passcode (OTP) to verify the payment.

Further, the gift-receiver module 214 is configured to provide access of the gift board to the gift-receiver upon receiving an alphanumeric code pertaining to the gift board received in the computing devices 104 of the gift-receiver from the application server 102. In an embodiment, the gift-receiver is presented with the gift board with the unique alphanumeric identifier. In an embodiment, the computing devices of the gift-receiver receive the alphanumeric code through a plurality of messaging platforms such as WhatsApp, SMS, and email. The gift-receiver module 214 is configured to open a vendor website of the brand selected by the gift-receiver in the gifting platform. Further, the gift-receiver module 214 is configured to superimpose an icon on the vendor website inside the gifting platform. In an embodiment, the icon presents a toolbar comprising a shortlist interface, a gift amount, and a back to my gift board interface. The shortlist interface displays the gifts selected by the gift-giver, and the back to my gift board interface enables the gift-giver to return to the gift board and continue the selection of the gifts from the gift board. The gift-receiver module 214 is configured to enable the gift-receiver to place an order for the gifts displayed in the shortlist interface. The gift-receiver module 214 is configured to present an address page to receive the address information of the gift-receiver. The gift-receiver module 214 is configured to process the order upon receiving the address information of the gift-receiver. In an embodiment, the gift-receiver module is configured to enable the gift-receiver to send a personal message to the gift-giver.

According to an embodiment herein, the application server 102 is configured to filter the results related to the gifts based on one or more primary demographics such as gender, age, relationship and location pin code. In an embodiment, the gifting platform of the present gift transaction system 100 includes a history panel in an account section to provide a record of the gifts given and received on the gifting platform. In an embodiment, the gifting platform of the present gift transaction system 100 includes a panel of unfinished gift boards saved by the user for future occasions.

According to an embodiment herein, the application server 102 is configured to utilize historical data and algorithms based on artificial intelligence and machine learning to suggest gifts based on past history, informing the users about new products/brands, innovations in the categories that were chosen by their gift receiver, reminder notifications about upcoming occasions like birthdays, anniversaries, festive celebrations etc. in the circle of the gift-givers, so that they don't miss key events concerning their near and dear ones.

Figure 3:
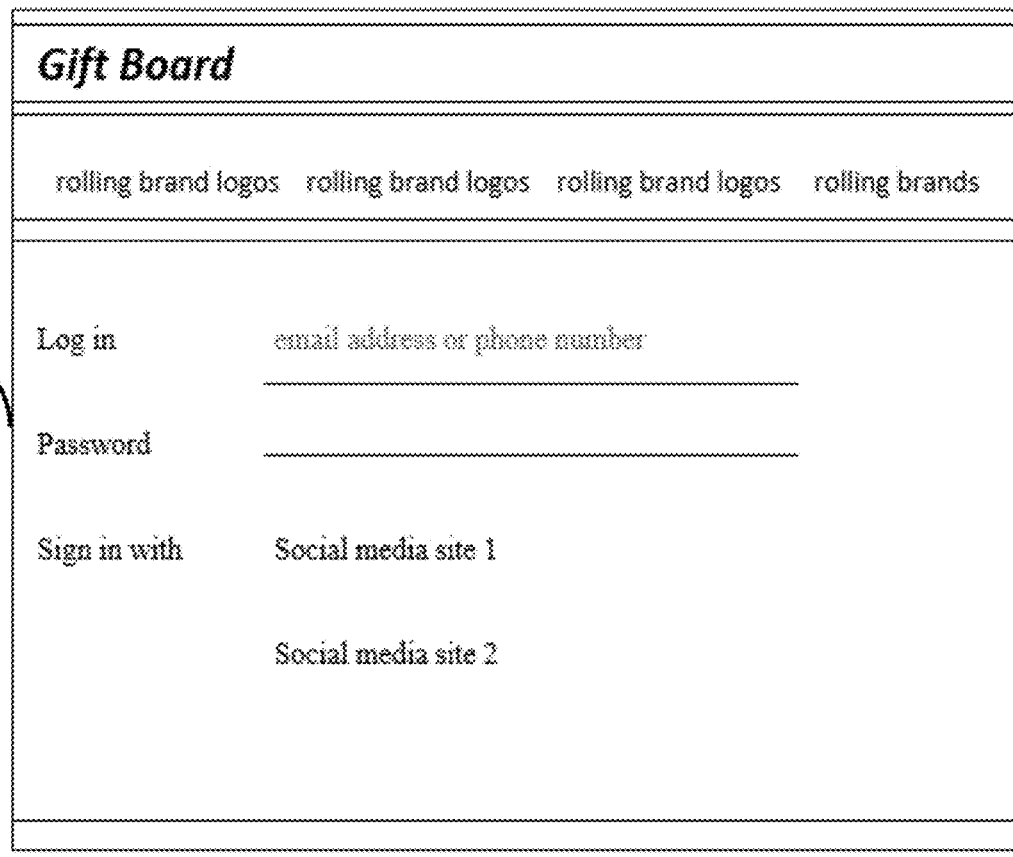
FIG. 3 illustrates an example of a log-in interface embedded in a gifting platform, in accordance with an embodiment of the present subject matter.

In operation, the gift-giver downloads/accesses the gifting platform (web app or mobile application). FIG. 3 illustrates an example of a log-in interface embedded in a gifting platform, in accordance with an embodiment of the present subject matter. As shown in FIG. 3, if the gift-giver has an account, the gift-giver is asked to provide log credentials on the log-in page 302.

FIG. 4 illustrates an example of a sign-up interface embedded in the gifting platform, in accordance with an embodiment of the present subject matter. If the gift-giver does not have an account, the gift-giver is directed to a sign-up form 402.

Figure 5:
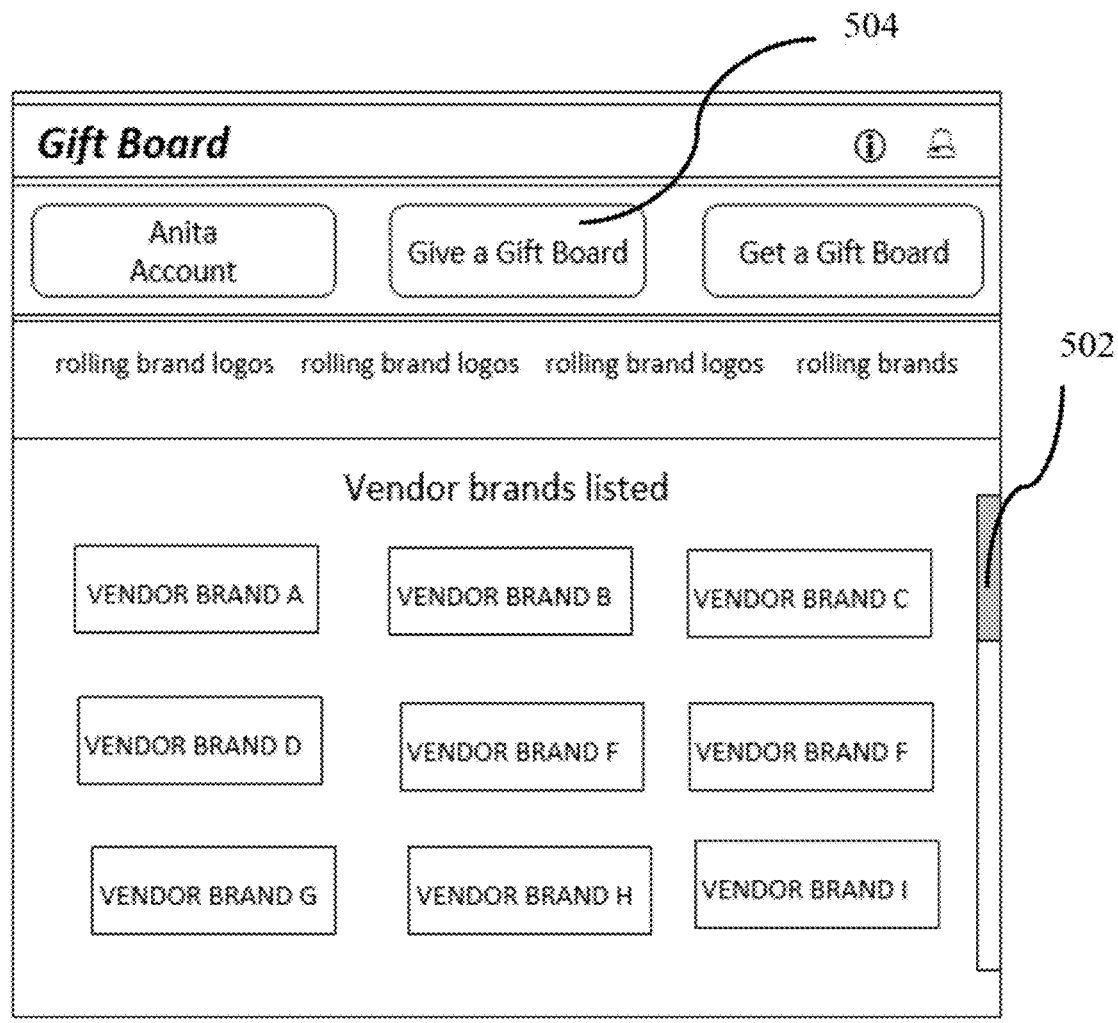
FIG. 5 illustrates an example of a home page interface embedded in the gifting platform, in accordance with an embodiment of the present subject matter.

FIG. 5 illustrates an example of a home page interface embedded in the gifting platform, in accordance with an embodiment of the present subject matter. After signing in, the gift-giver is presented with a home page 502 where the gift-giver can tap on "give a gift board" 504.

Figure 6:
FIG. 6 illustrates an example of a basic information interface embedded in the gifting platform, in accordance with an embodiment of the present subject matter.

FIG. 6 illustrates an example of a basic information interface embedded in the gifting platform, in accordance with an embodiment of the present subject matter. After tapping, a window 602 opens that asks for basic information related to the gift-receiver such as name, city, relationship, gender, age, and message.

Figure 7:
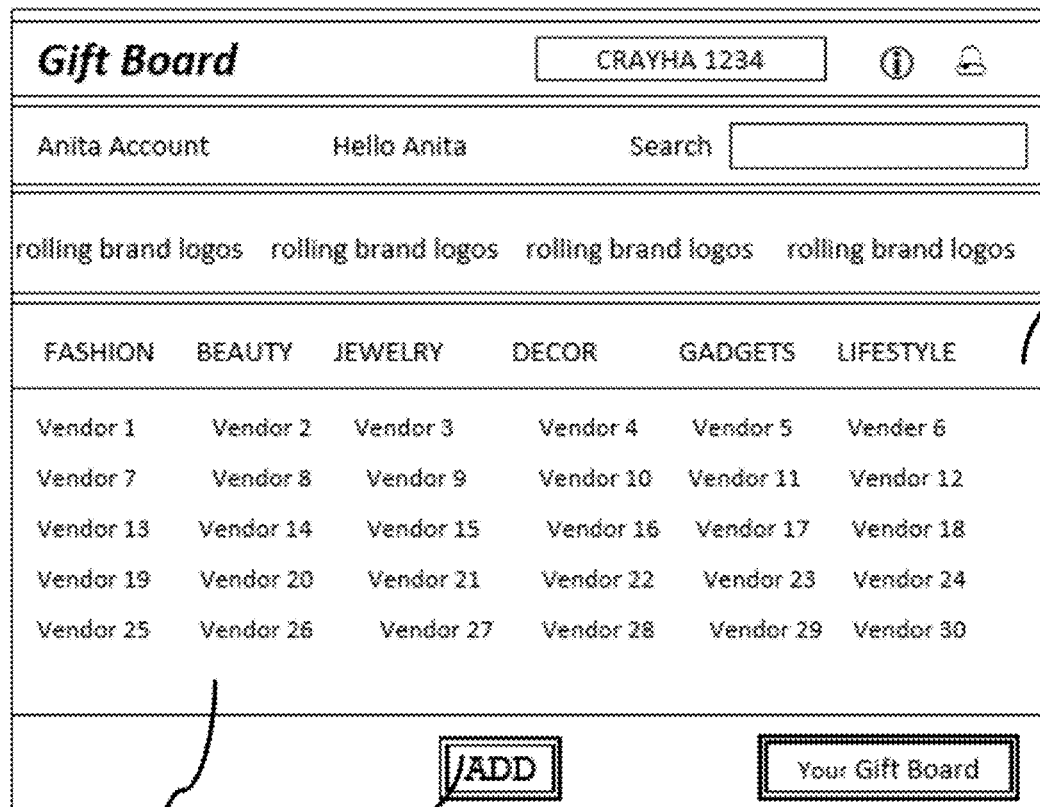
FIG. 7 illustrates an example of a gift-giver interface embedded in the gifting platform, in accordance with an embodiment of the present subject matter.

FIG. 7 illustrates an example of a gift-giver interface embedded in the gifting platform, in accordance with an embodiment of the present subject matter. With the above basic information of the gift-receiver, the website presents the gift-giver with a window containing a range of brands 702 for gifting, wherein the brands are filtered by the parameters mentioned by the gift-giver in the previous window. The brands 702 are organized under relevant categories 704 for easy retrieval. Also, the gift-giver selects several brands that the gift-giver thinks would appeal to the intended gift-receiver within the gift budget and clicks add 706.

Figure 8:
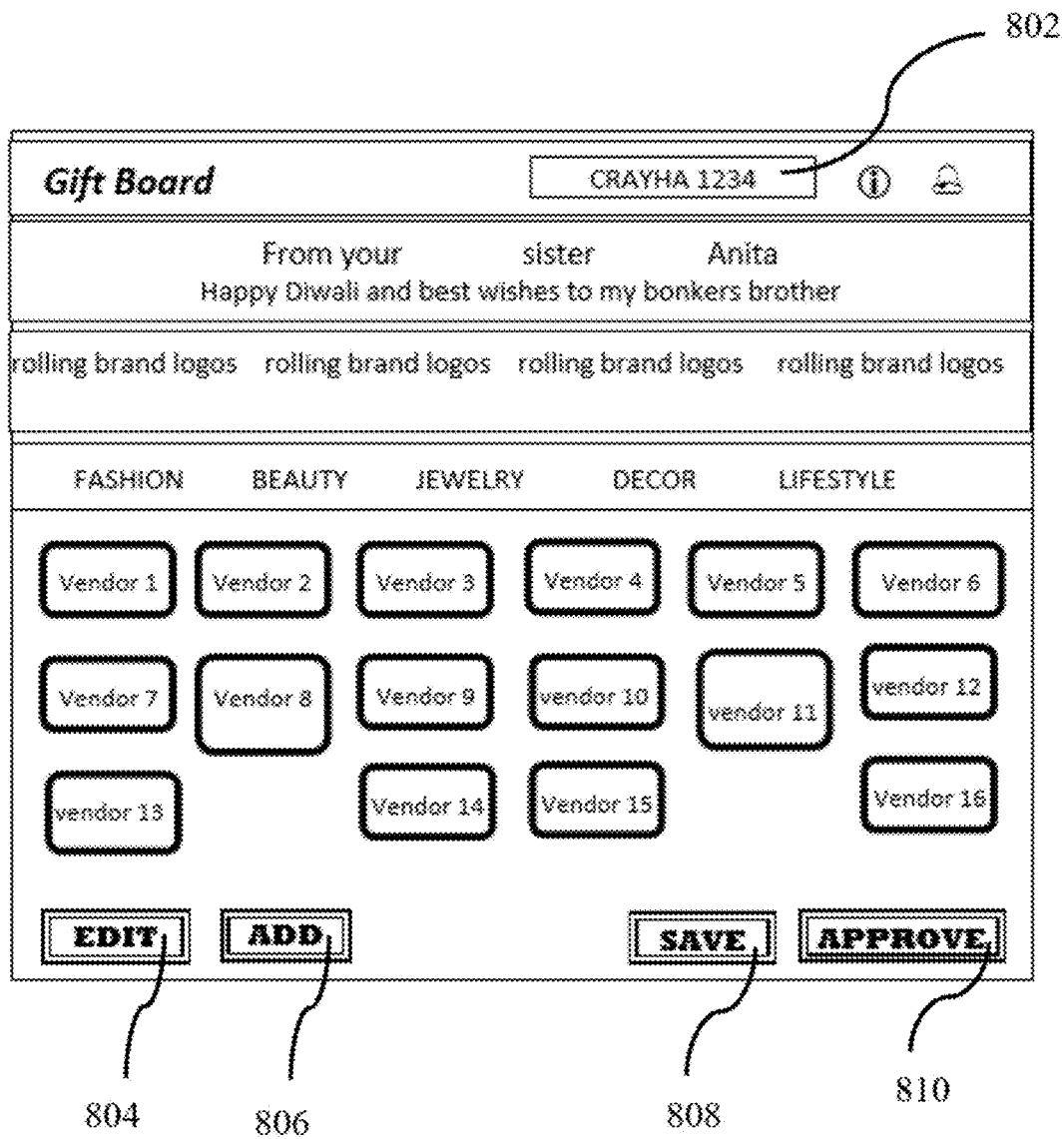
FIG. 8 illustrates an example of a selection interface embedded in the gifting platform, in accordance with an embodiment of the present subject matter.

FIG. 8 illustrates an example of a selection interface embedded in the gifting platform, in accordance with an embodiment of the present subject matter. As the gift-givers click their choices, they will promptly be added to the gift board with a unique number 802. The gift-giver can toggle between the application window and the gift board. The gift-giver can tap edit button 804 to remove a gift item and tap add button 806 to go back to the previous window and add a brand. The gift-giver may tap save button 808 to back up their selections in order to return to them at a later time.

Figure 9:
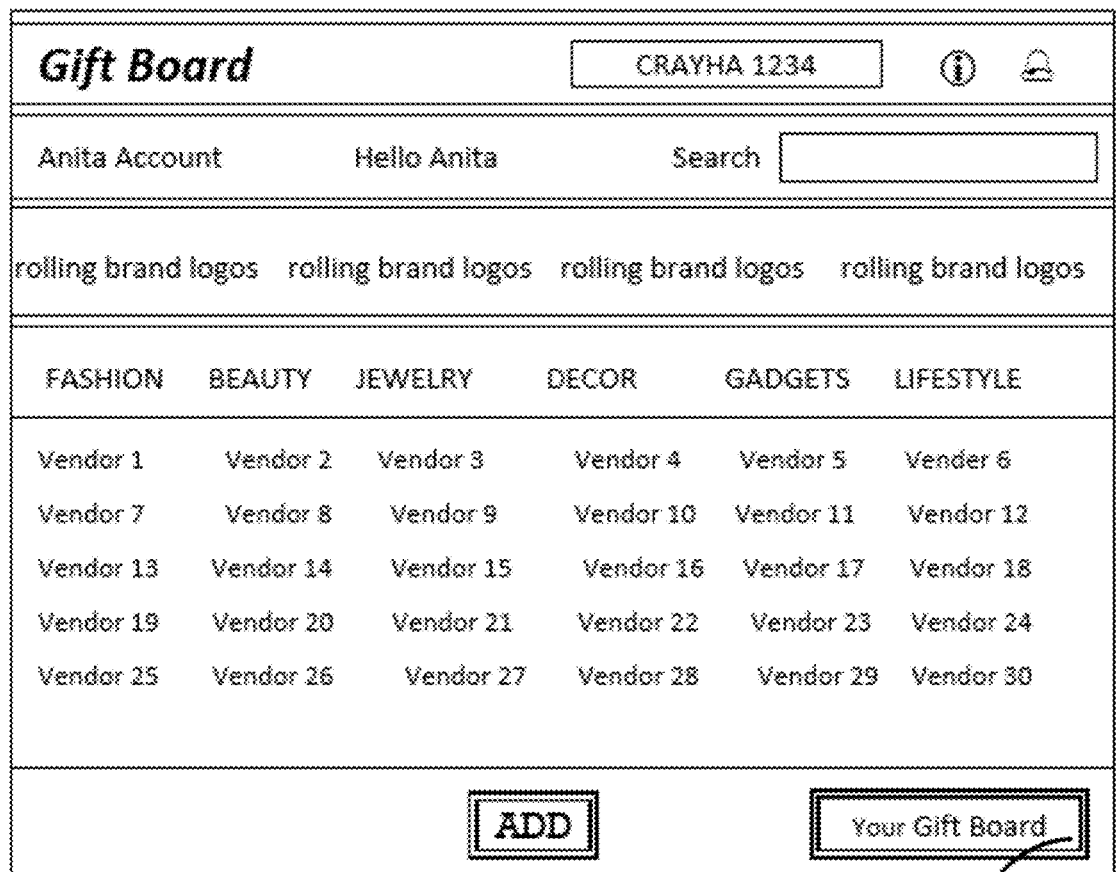
FIG. 9 illustrates an example of a gift board interface embedded in the gifting platform, in accordance with an embodiment of the present subject matter.

FIG. 9 illustrates an example of a gift board interface embedded in the gifting platform, in accordance with an embodiment of the present subject matter. FIG. 9 is explained in conjunction with FIG. 8. The gift-givers can tap "Your Gift Board" 902 to check their assembled gift board. The gift-givers may thus add or remove items from their gift board. When the gift-givers are satisfied, they click approve 810 (FIG. 8) in the Gift Board.

Figure 10:
FIG. 10 illustrates an example of a gift-receiver contact interface embedded in the gifting platform, in accordance with an embodiment of the present subject matter.

FIG. 10 illustrates an example of a gift-receiver contact interface embedded in the gifting platform, in accordance with an embodiment of the present subject matter. Once the gift-giver clicks on approve 810, the gift-giver has to enter the gift-receiver's contact information 1002 such as name, phone number, and email id. Thereafter, the gift-giver clicks on "Proceed to Pay" 1004.

Figure 11:
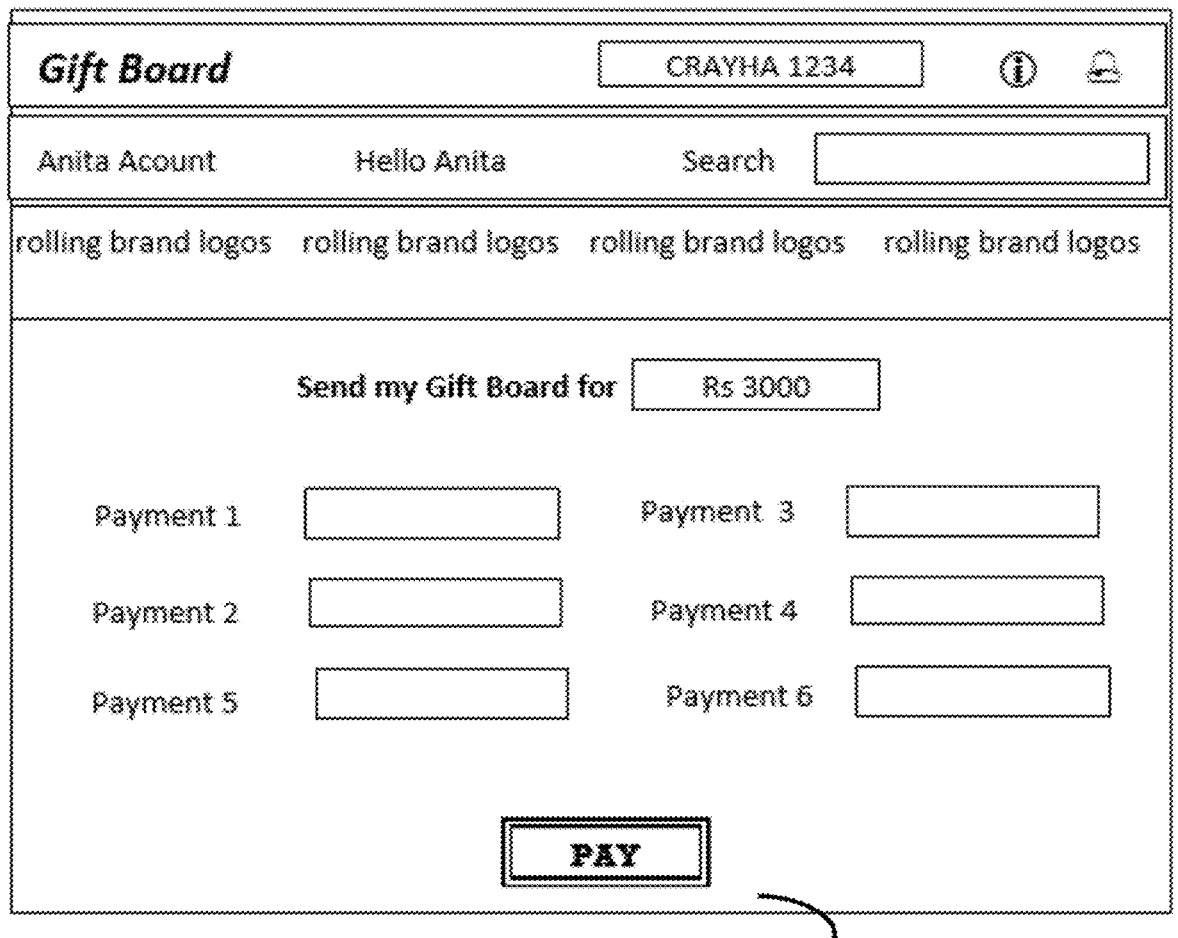
FIG. 11 illustrates an example of a first payment interface embedded in the gifting platform, in accordance with an embodiment of the present subject matter.

FIG. 11 illustrates an example of a first payment interface embedded in the gifting platform, in accordance with an embodiment of the present subject matter. Upon clicking on "Proceed to Pay" 1004, the website/app takes the gift-giver to a payment page 1102 where the gift-giver may complete the transaction with any of the options available, and verified by a one-time password (OTP) received on the gift-giver's phone or email id.

Figure 12:
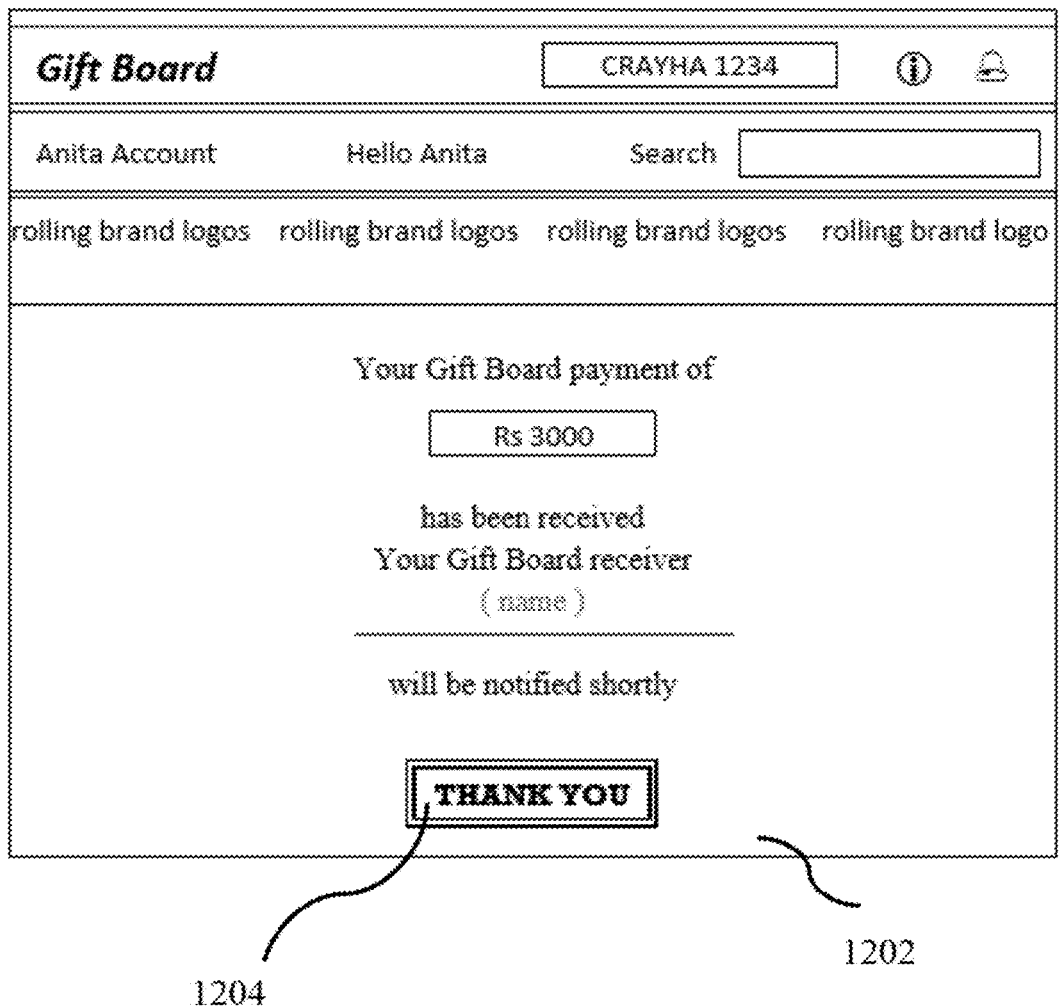
FIG. 12 illustrates an example of an acknowledgment interface embedded in the gifting platform, in accordance with an embodiment of the present subject matter.

FIG. 12 illustrates an example of an acknowledgment interface embedded in the gifting platform, in accordance with an embodiment of the present subject matter. After OTP verification, the website/app will display a message of acknowledgment to the gift-giver through an acknowledgment page 1202. When the gift-giver clicks "Thank You" 1204, the website/app brings the gift-giver back to the home page where the gift-giver may start a new cycle with "Gift a Gift Board" or "Get Your Gift Board". Further, the gift-givers may click their account from the drop-down window and proceed to log out from the website or mobile app.

Figure 13:
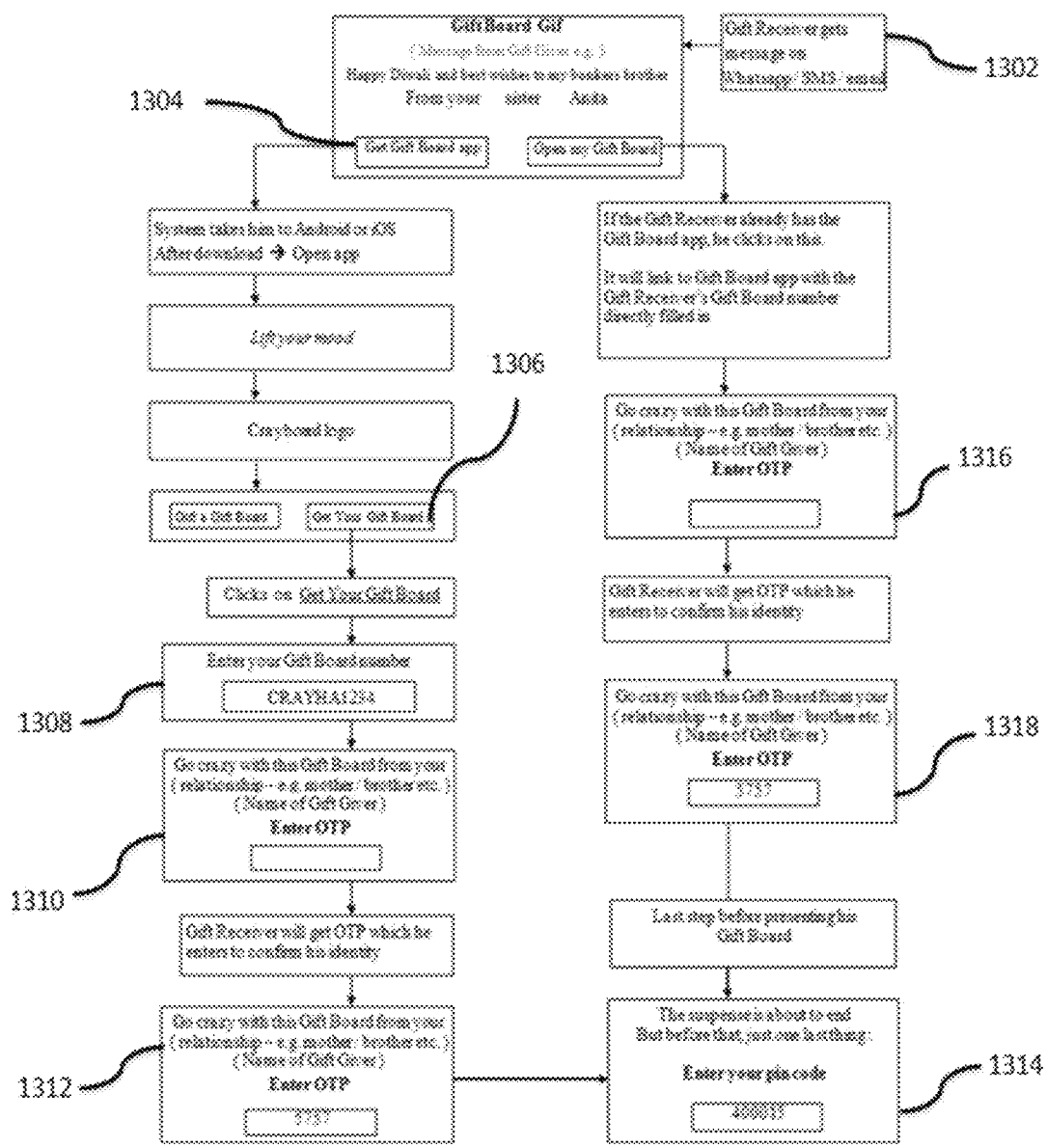
FIG. 13 illustrates an example of a flowchart of accessing the gift board by the gift receiver, in accordance with an embodiment of the present subject matter.

FIG. 13 illustrates an example of a flowchart of accessing the gift board by the gift receiver, in accordance with an embodiment of the present subject matter. At step 1302, when the transaction is completed from the gift-giver, the gift-receiver receives a message on WhatsApp, SMS, or email regarding the gift board created by the gift-giver. If the gift-receivers do not have a mobile application installed on their phones, then at step 1304, the gift-receivers have to click on "Get Gift Board App" to install the mobile application on their phones. The operating system of the computing device guides the gift-receivers to the play store or app store to download the mobile application related to the present gifting platform. Then at step 1306, the gift-receiver click on the "Get Your Gift Board" section presented by the mobile application. At step 1308, the mobile application enables the gift-receivers to enter their unique numeric identifier received from the gift-giver. Then at step 1310, the gift-receivers receive an OTP that needs to be entered into the mobile app interface to confirm their identity. Upon receiving the OTP at step 1312, the gift-receivers have to enter their location pin code at step 1314. Thereafter, the gift board is presented to the gift-receiver.

Further, if the gift-receivers have mobile applications installed on their phones, then at step 1316, the gift-receivers have to click on "Open my Gift Board" to directly enable the gift-receivers to enter an OTP received on their phones to confirm their identity. Upon receiving the OTP at step 1318, the gift-receivers have to enter their location pin code at step 1314. Thereafter, the gift board is presented to the gift-receiver.

Figure 14:
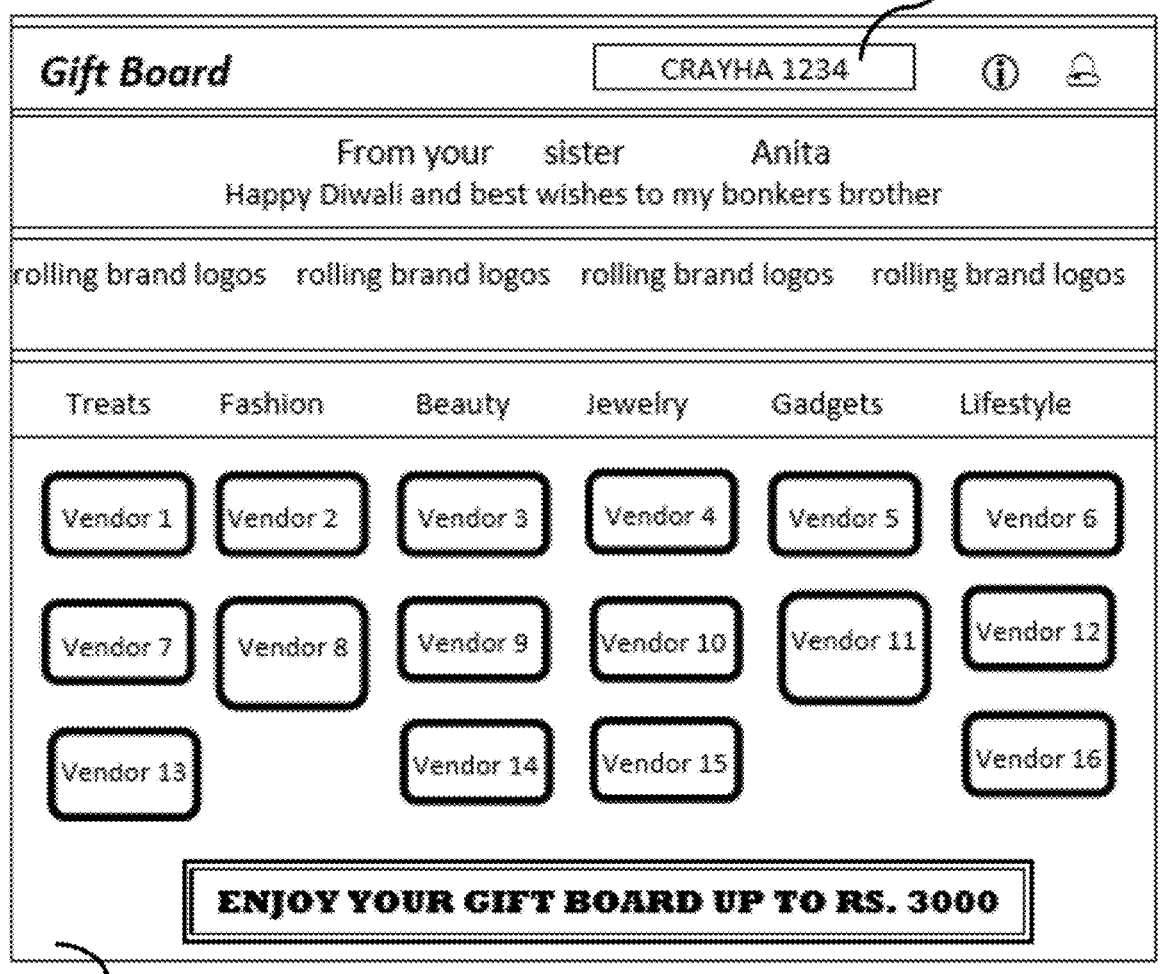
FIG. 14 illustrates an example of the gift-receiver interface that depicts the gift board with a unique numeric identifier, in accordance with an embodiment of the present subject matter.

FIG. 14 illustrates an example of the gift-receiver interface that depicts the gift board with a unique alphanumeric identifier, in accordance with an embodiment of the present subject matter. Upon entering his pin code, the gift-receiver is presented with the gift board 1404 with its unique alphanumeric identifier 1402.

Figure 15:
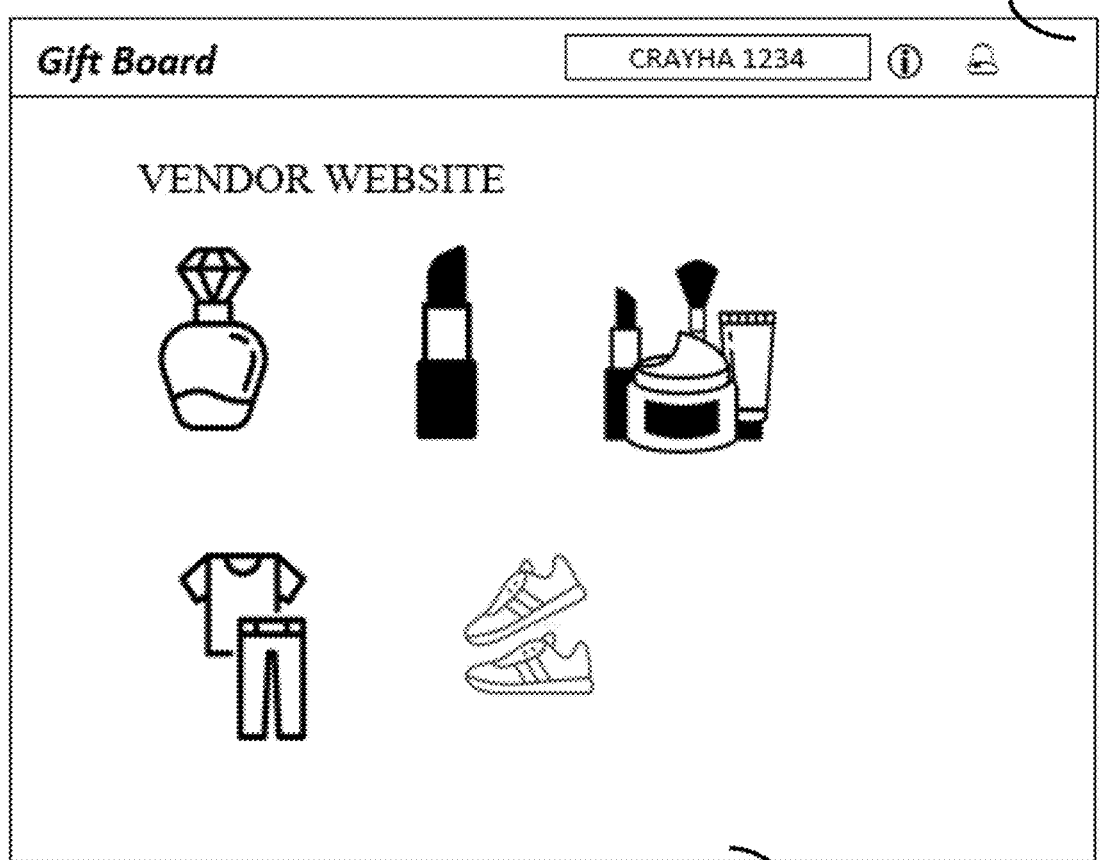
FIG. 15 illustrates an example of a vendor website interface embedded in the gifting platform, in accordance with an embodiment of the present subject matter.

FIG. 15 illustrates an example of a vendor website interface embedded in the gifting platform, in accordance with an embodiment of the present subject matter. When the gift-receiver clicks on a brand 1504, it opens the website of that brand in the browser 1502 of the present gifting platform.

Figure 16:
FIG. 16 illustrates an example interface of superimposing an icon on the vendor website inside the gifting platform, in accordance with an embodiment of the present subject matter.

FIG. 16 illustrates an example interface of superimposing an icon on the vendor website inside the gifting platform, in accordance with an embodiment of the present subject matter. An icon 1602 of the present gifting platform is superimposed on the vendor website inside the browser of the present gifting platform.

Figure 17:
FIG. 17 illustrates an example of a toolbar interface opened on the vendor website inside the gifting platform, in accordance with an embodiment of the present subject matter.

FIG. 17 illustrates an example of a toolbar interface opened on the vendor website inside the gifting platform, in accordance with an embodiment of the present subject matter. Once the gift-receivers click on the icon, the icon present brings up a toolbar 1702 with various functionalities such as "My Gift Board shortlist", "My gift amount", and "Back to My Gift Board".

Figure 18:
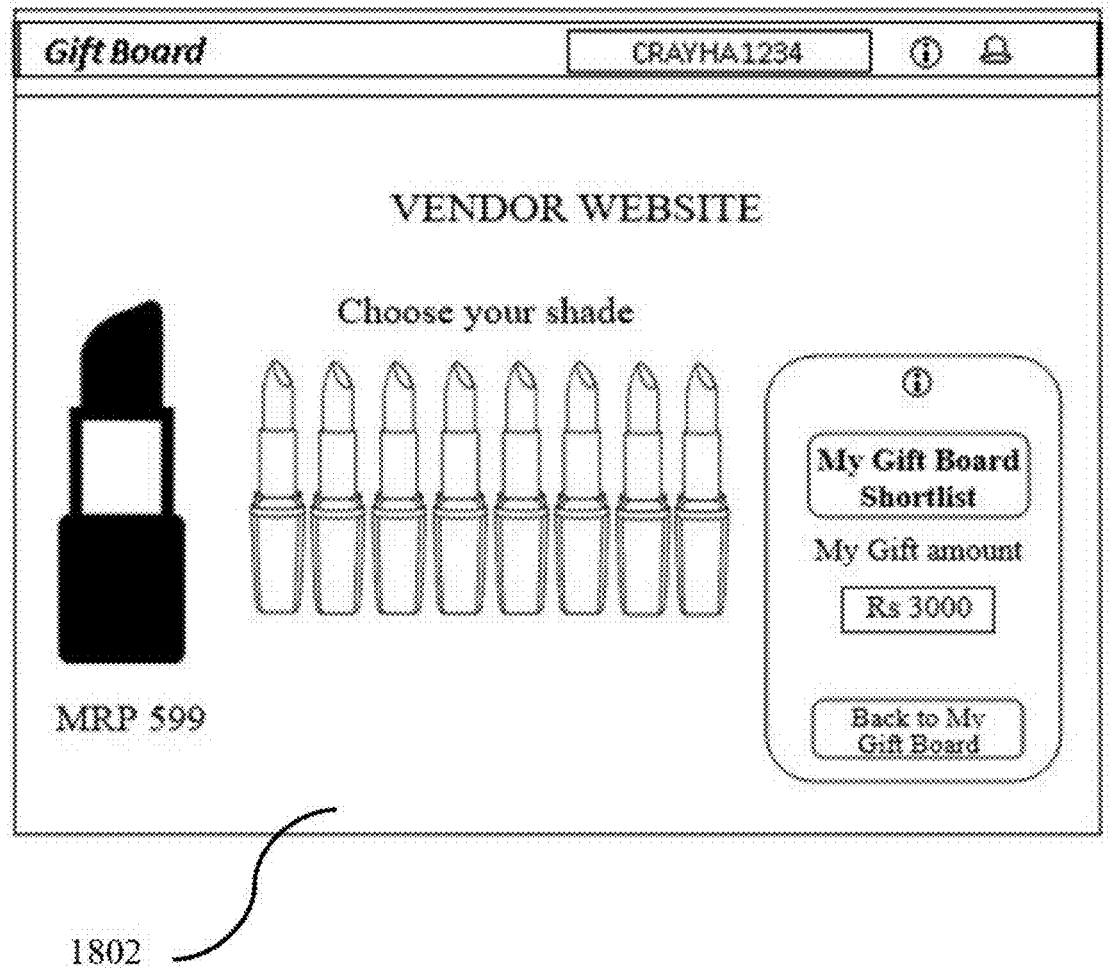
FIG. 18 illustrates an example of a gift-receiver selection interface embedded in the gifting platform, in accordance with an embodiment of the present subject matter.

FIG. 18 illustrates an example of a gift-receiver selection interface embedded in the gifting platform, in accordance with an embodiment of the present subject matter. The gift-receiver selection interface 1802 enables the gift-receiver to select a brand with color/size/quantity etc. from the vendor website.

Figure 19:
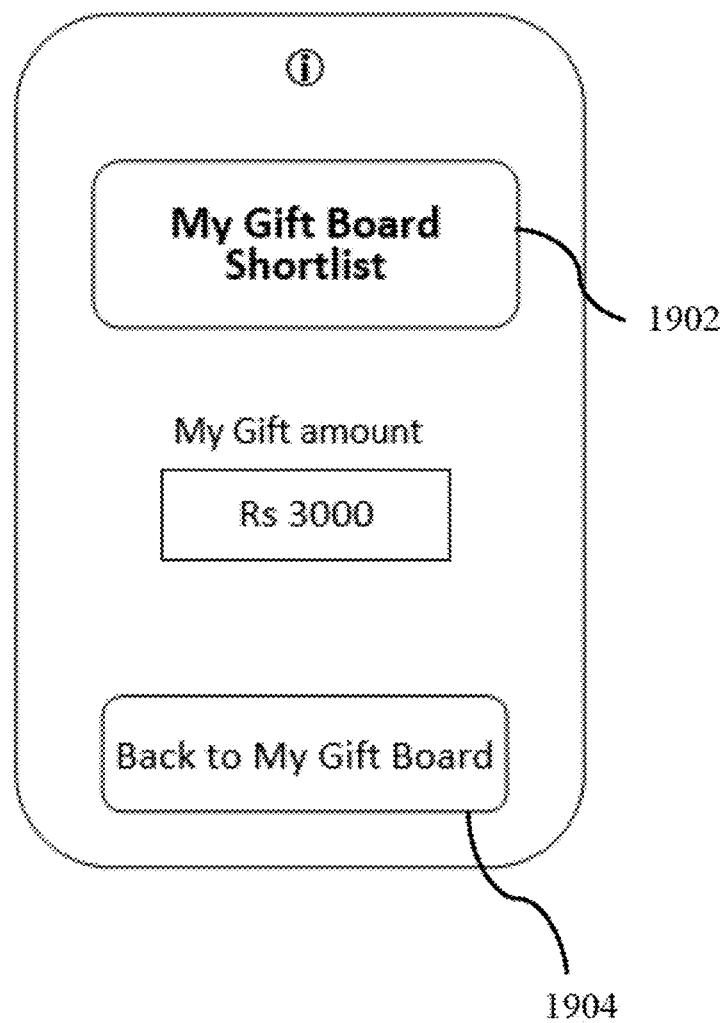
FIG. 19 illustrates an example of the toolbar interface with the various functionalities, in accordance with an embodiment of the present subject matter.

FIG. 19 illustrates an example of the toolbar interface with the various functionalities, in accordance with an embodiment of the present subject matter. The gift-receivers click on "My Gift Board shortlist" 1902 in the toolbar. The mobile application working on the back end copies the URL for that specific product from the vendor website in the browser—and pastes it on the gift-receiver's shortlist. Further, if the gift-receivers click "Back to My Gift Board", 1904 then the mobile application returns to their gift board to continue this process. The gift-receivers may click on another brand of their liking from their gift board. Again, the mobile application opens the website of that brand in the browser of the gifting platform. Again, the gift-receivers select a product and click on "My Gift Board shortlist" in the toolbar. The mobile application working on the back end copies the URL for that specific product from the vendor website in the browser—and pastes it on the Gift-receiver's shortlist. The gift-receivers can repeat the process by going through several brands of their liking from their gift boards, selecting their products, and adding them to their shortlist.

Figure 20:
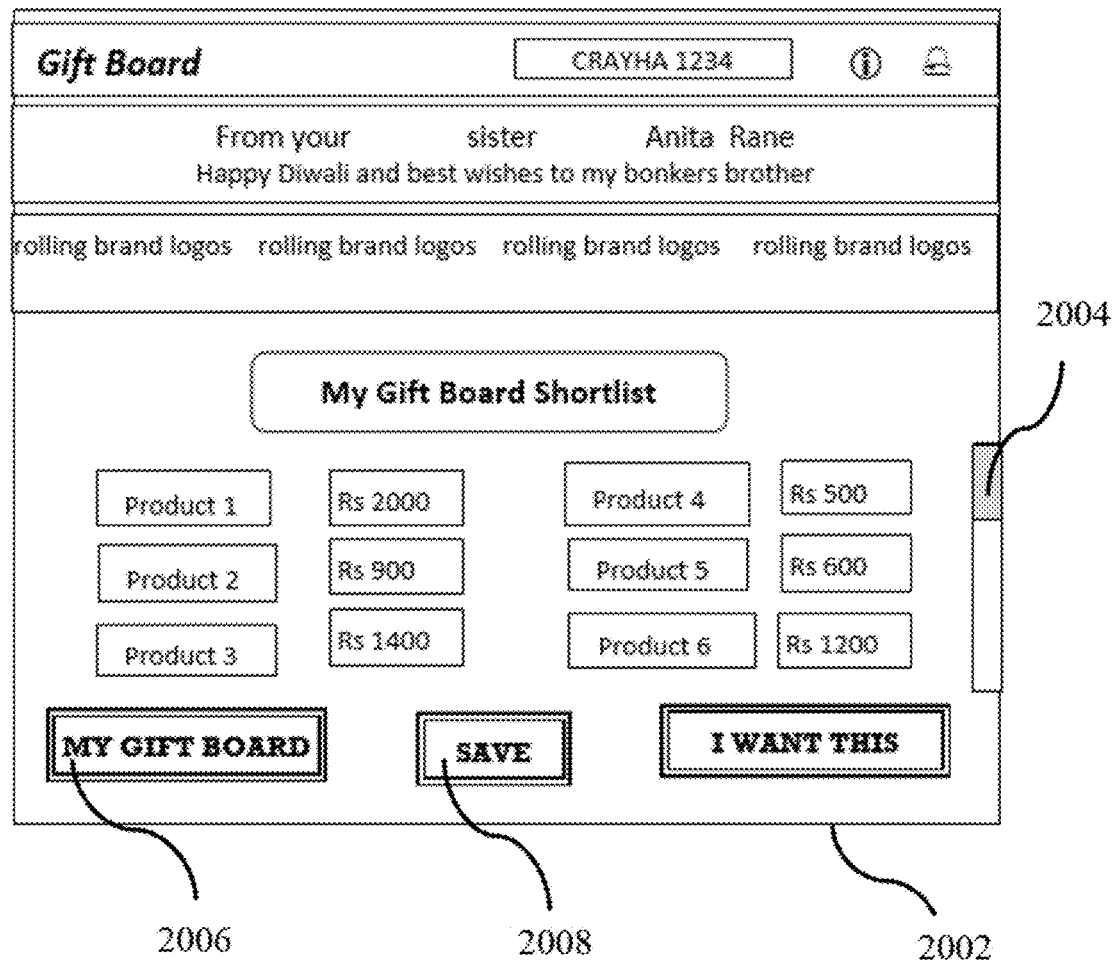
FIG. 20 illustrates an example of a shortlist accessed via the toolbar interface, in accordance with an embodiment of the present subject matter.
Figure 21:
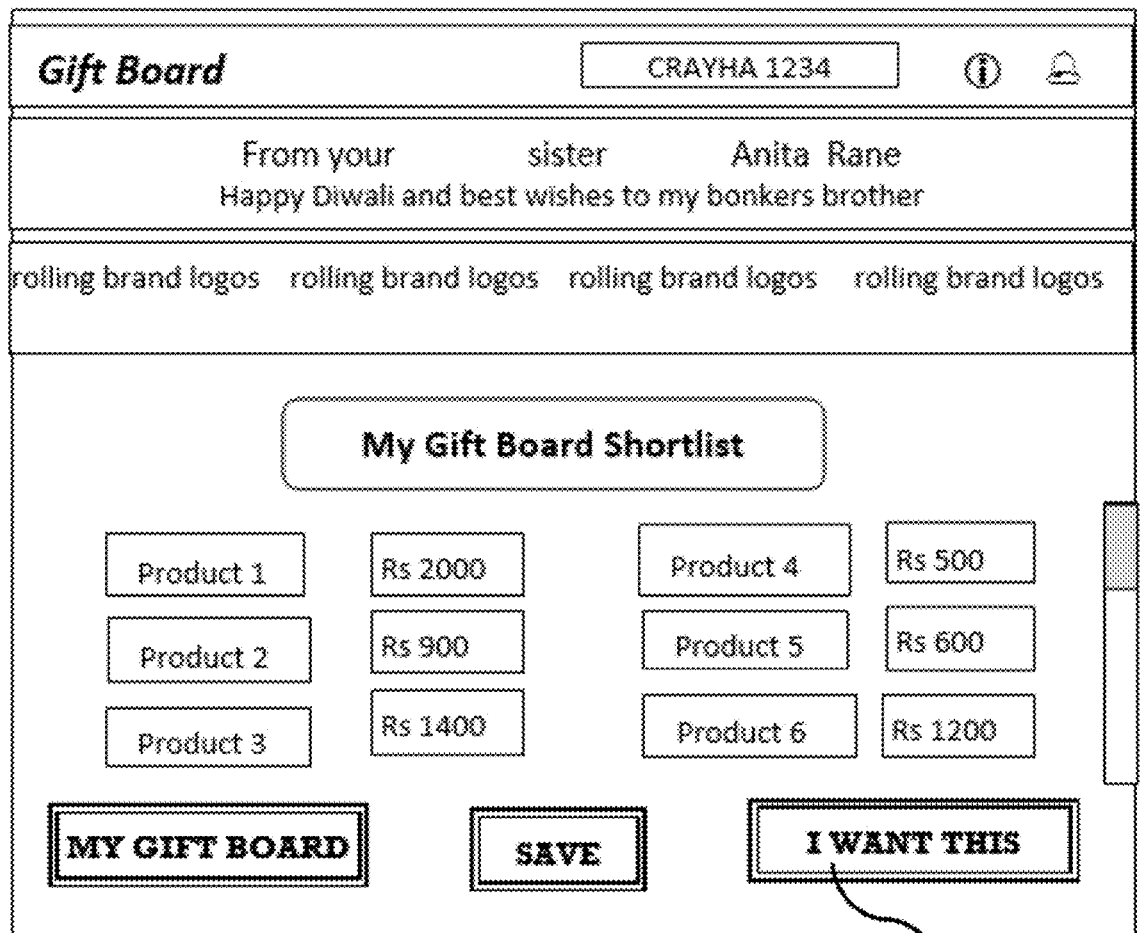
FIG. 21 illustrates an example of the shortlist interface with the gifts selected by the gift-receiver, in accordance with an embodiment of the present subject matter.

FIG. 20 illustrates an example of a shortlist page integrated within the toolbar interface, in accordance with an embodiment of the present subject matter. The toolbar in FIG. 19, enables the gift-receiver to double tap on "My Gift Board shortlist". Double-tapping on "My Gift Board shortlist" will take the gift-receiver to the window in FIG. 20 which displays their shortlisted products 2002 with their prices, and a scroll bar 2004. After viewing their shortlisted gifts, if the receiver wishes to choose more items, they may tap the My Gift Board button 2006 to return to their board and continue shopping. The gift-receiver may also save their shortlist by tapping the save button 2008 enabling them to return to it later and complete the transaction. When the gift-receiver is satisfied, he/she can proceed to order his/her gift in the next step. FIG. 21 illustrates an example of the shortlist interface with the gifts selected by the gift-receiver, in accordance with an embodiment of the present subject matter. Lastly, the gift-receiver can proceed to order his/her gift. The gift-receiver clicks his/her first choice from the shortlist and taps "I want this" 2102. The gift-receiver may choose more than one item, tapping it within his/her shortlist, then clicking "I want this" 2102. When the gift-receiver is done, he/she double-taps "I want this" 2102. This takes the gift-receiver to the next page and the gift-receiver clicks "Place My Gift Order" 2202 (shown in FIG. 22). If his/her gift choice is below 75% of the gift amount then a pop-up message will inform him/her; "Choose more Gifts". Further, if the chosen item is less than the value of the gift, the balance is added to their wallet—which is not restricted to a single vendor, but applicable across vendors of the customer's choice.

Figure 22:
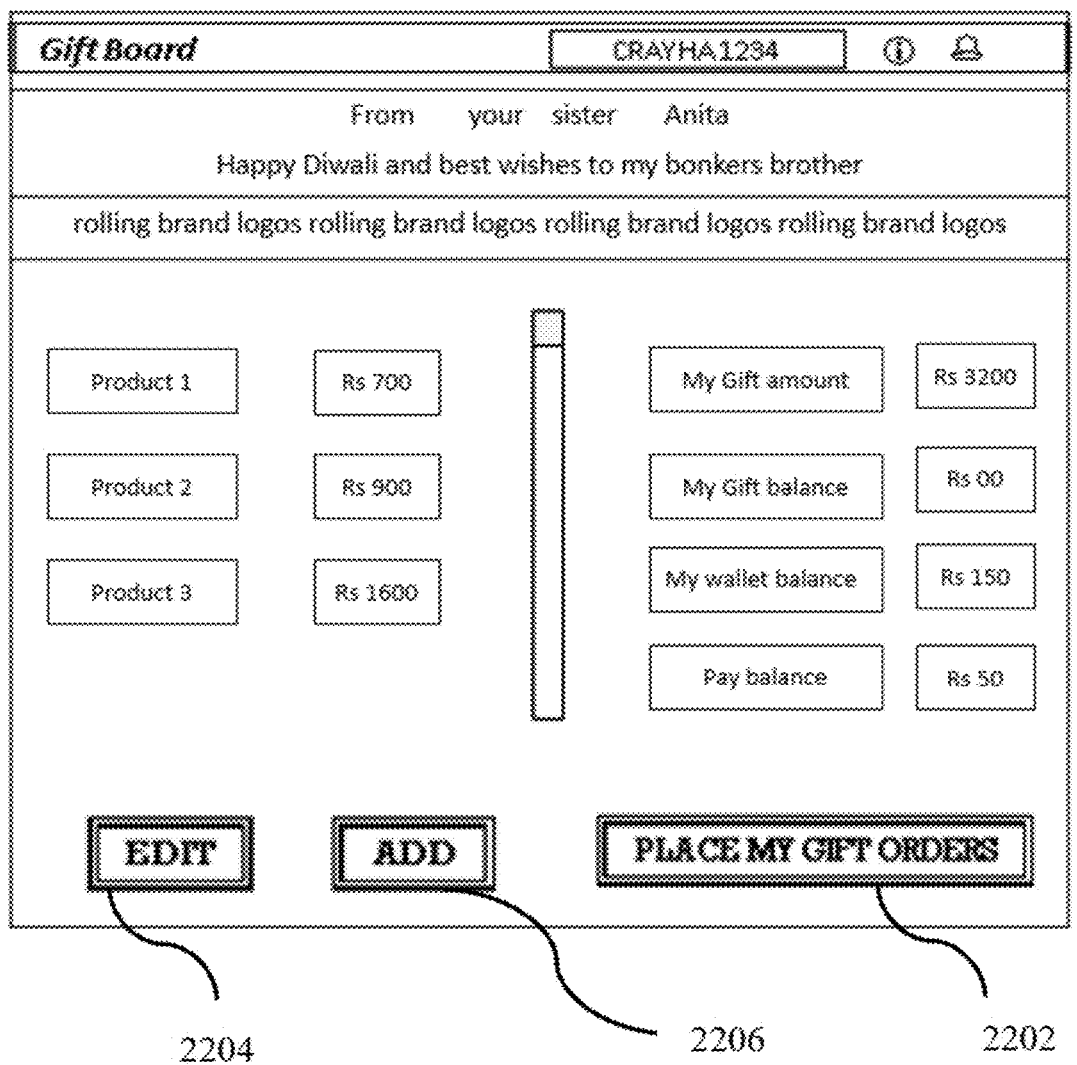
FIG. 22 illustrates an example of an order interface embedded in the gifting platform, in accordance with an embodiment of the present subject matter.

FIG. 22 illustrates an example of an order interface embedded in the gifting platform, in accordance with an embodiment of the present subject matter. If the gift-receiver's selection clears 75% of his gift amount, the balance is added to his/her wallet. If the gift-receiver's selections are more than his/her gift amount, the balance in his/her wallet will automatically cover the gift. If the gift receiver's selections are more than the gifted amount than his/her gift amount plus his/her wallet balance, then the gift-receiver may choose to pay the difference.

Now the gift-receiver has two options: 1) He/she may again tap "Place My Gift Order". This will take him/her to the "Payment page" 2302 (shown in FIG. 23). When he/she hits "Place My Gift Order", it takes him/her to the payment gateway. The gift-receiver may hit "Edit" 2204 to remove an item from his/her list. If the gift-receiver wishes to bring another item back, tapping "Add" 2206 will take him/her back to his/her shortlist. When the gift-receiver has worked out the final list of gifts he wants, he/she can proceed by tapping "Place My Gift Order" 2202 and it is done.

Figure 23:
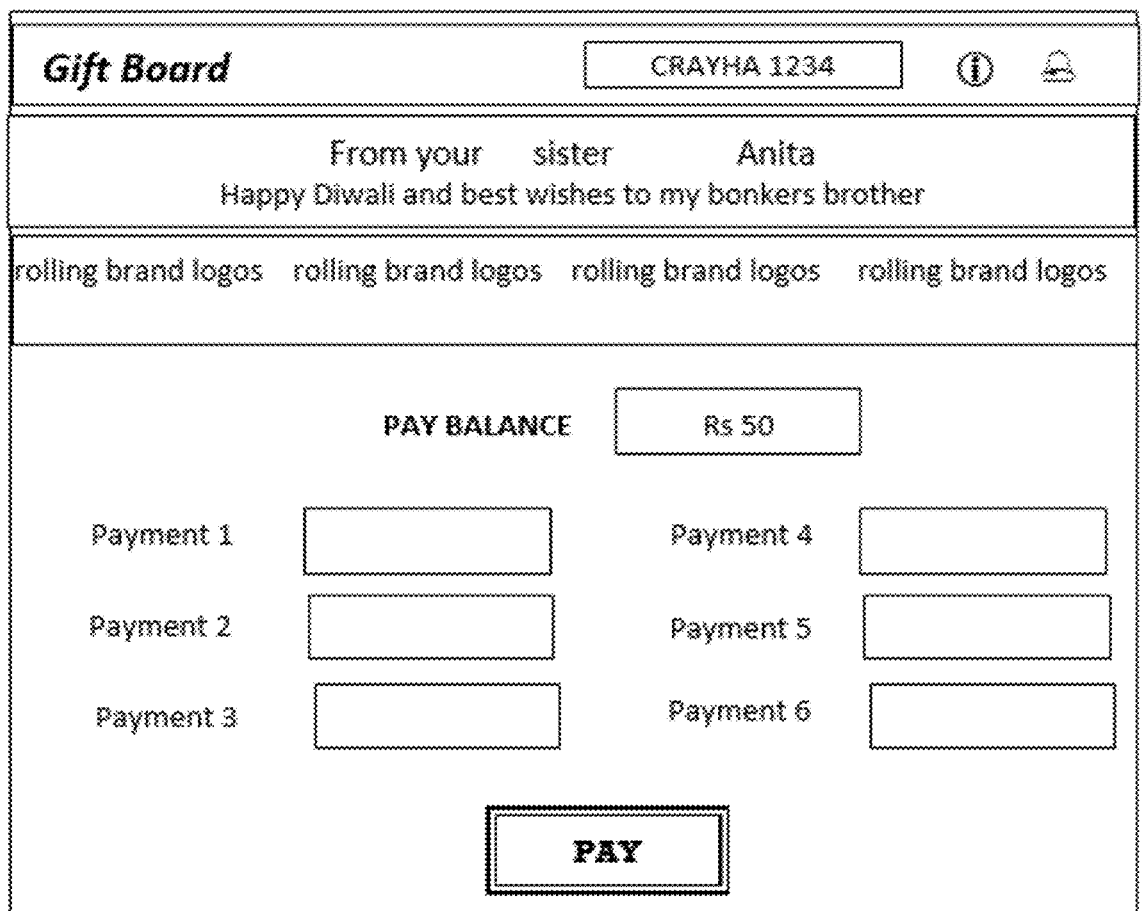
FIG. 23 illustrates an example of a second payment interface embedded in the gifting platform, in accordance with an embodiment of the present subject matter.

FIG. 23 illustrates an example of a second payment interface embedded in the gifting platform, in accordance with an embodiment of the present subject matter. If the gift-receiver's selections are more than his gift amount and his wallet balance, he/she may pay the difference by any of the payment options available on the payment page 2302. The amount is added after verifying through an OTP.

Figure 24:
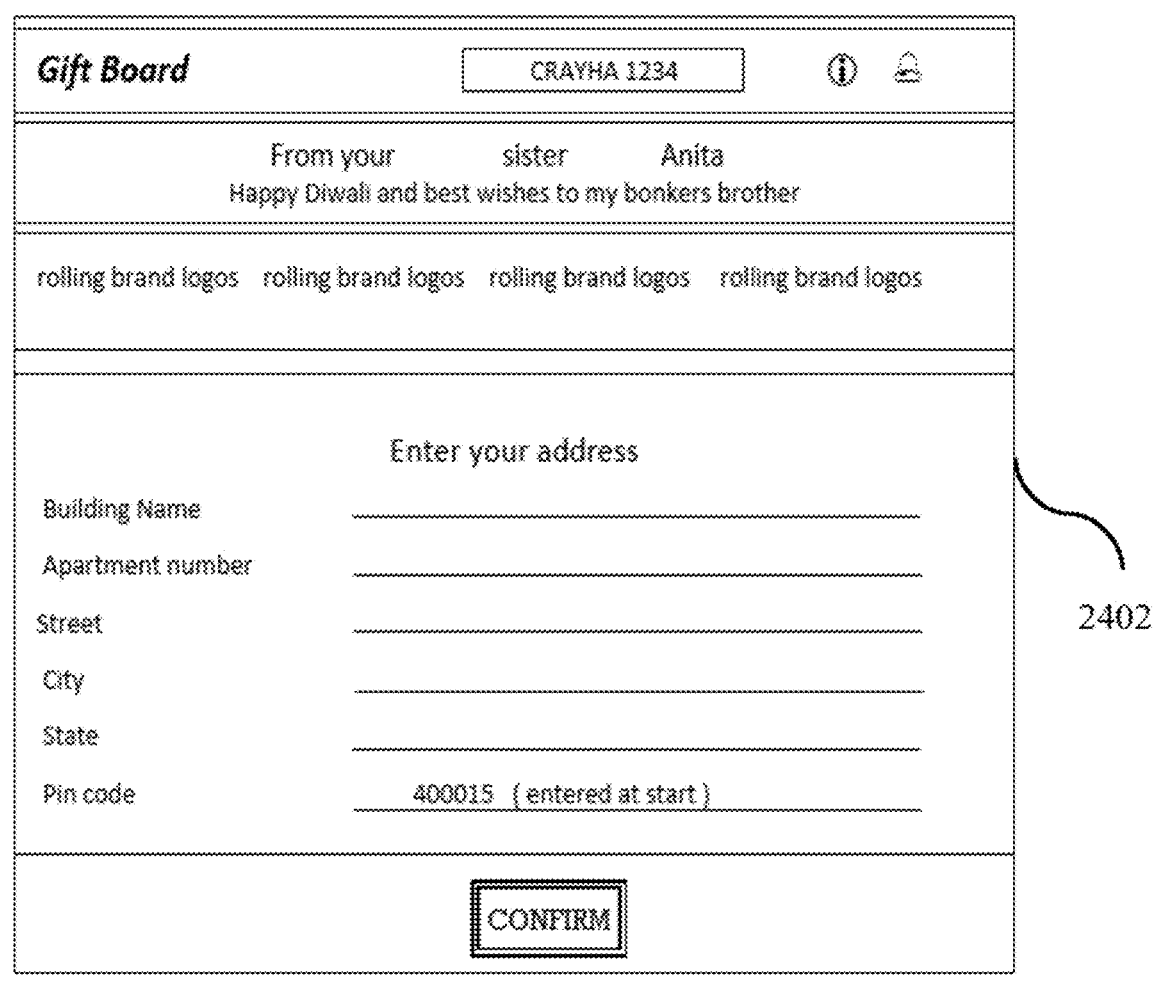

FIG. 24 illustrates an example of an address interface embedded in the gifting platform, in accordance with an embodiment of the present subject matter. After "Place My Gift Order" and/or payment and OTP steps, the gift-receiver is presented with an address page 2402 where she/he has to enter and confirm her/his address where the gifts need to be delivered.

Figure 25:
FIG. 25 illustrates an example of a personal message interface embedded in the gifting platform, in accordance with an embodiment of the present subject matter.

FIG. 25 illustrates an example of a personal message interface embedded in the gifting platform, in accordance with an embodiment of the present subject matter. After confirming the address, the present system will auto-process the whole order. The gift-receiver does not have to manually fill in any details on any of the vendor sites. The gift-receivers can send a personal message 2502 to their gift-givers and tap "Thank You" 2504. After the gift-receiver clicks "Thank You" 2504, the mobile application brings him/her back to the home page where he/she may gift a gift board to someone or tap "Get Your Gift Board" if he/she has received more gift boards or he/she may tap his/her "Account" and from the drop-down window and log out from the present system.

Thus, the present gift transaction system and method provide an efficient, simpler, and more elegant framework for gifting. Instead of choosing a single gift, the present gift transaction system enables the gift-givers to create an entire line-up of gifts across a range of categories and price points and leave it to the gift-receivers to configure the items best suited for them. The present gift transaction system is based on a genre that expands the notion of how gifts are exchanged. For example, if the gift-giver might choose to gift a lipstick, with the present gift transaction system, the gift-giver will instead gift makeup—and the gift-receiver is free to pick a lipstick or mascara or foundation or moisturizing cream. Therefore, the gift-giver has the luxury of offering not just from a makeup category—but also other categories/genres such as fashion, jewelry, gourmet, gadgets, or home décor. All the categories have a menu of brands and vendors. This means the gift-giver is bound only by their imagination. While for the gift-receiver, getting a notification from the application is not an occasion for a mere gift, but a ticket to a digital shopping mall with a feast of choices. By offering extensive choice, the gift-giver cannot go wrong. And by getting to choose, the gift-receiver secures the perfect gift. The gifting platform of the present invention assists the gift-giver in curating their gifts and enables the gift-receiver to take their pick off the lot. This gifting process changes the gifting model from the gift-giver chasing down the perfect gift to the vendors lining up to offer their best on the gift-giver's personalized gift board and the gift-receiver being spoilt for choice. Further, the present gift transaction system and method provide the gifting platform (website or app) that creates a bespoke collection and transmits that collection as a single unit to another entity. Further, the present gift transaction system and method is not only useful and efficient for the gift-giver and gift-receiver but also helps the vendors to increase their customer base by driving the customer traffic their way and reducing the time, labor, and expense of returns and exchanges.

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure, as described in the claims.

I claim:

1. A gift transaction system for creating a gift board of a plurality of gifts by a gift-giver, and enabling a gift-receiver to select the gifts from the gift board, the gift transaction system comprises:
 one or more processors operable to execute one or more routines pertaining to the creation of the gift board and selection of the gifts; and
 a memory to store the one or more routines executed by the one or more processors, wherein the one or more routines comprising:
  a gift-giver module configured to:
   provide an access to a digital page of a gifting platform through one or more computing devices:
   present a home page of the gifting platform upon receiving credentials from the gift-giver and initiate a step of creating the gift board upon receiving a request touch gesture;
   receive data of the gift-receiver and a gift amount from the gift-giver upon receiving the request touch gesture;
   present the plurality of gifts on the gifting platform, wherein the plurality of gifts is associated with a plurality of brands and a plurality of categories across a plurality of vendors for gifting based on the received data pertaining to the gift-receiver:
  enable the gift-giver to select the one or more gifts from the plurality of gifts presented on the gifting platform;
  add the gifts to the gift board upon selection of the one or more gifts by the gift-giver;
  receive approval from the gift-giver for the gifts added to the gift board;
  receive contact information of the gift-receiver; and
  receive the gift amount from the gift-giver through one or more payment modes and receive a one-time passcode (OTP) to verify the payment; and
a gift-receiver module configured to:
  provide access of the gift board to the gift-receiver upon receiving an alphanumeric code pertaining to the gift board received in the computing devices of the gift-receiver from an application server;
  open a vendor website of the brand selected by the gift-receiver in the gifting platform;
  superimpose an icon on the vendor website inside the gifting platform, wherein the icon presents a toolbar comprising a shortlist interface, a gift amount, and a back to my gift board interface, wherein the shortlist interface displays the gifts selected by the gift-receiver, and the back to my gift board interface enables the gift-receiver to return to the gift board and continue the selection of the gifts from the gift board;
  enable the gift-receiver to place an order for the gifts displayed in the shortlist interface;
  present an address page to receive the address information of the gift-receiver; and
  process the order upon receiving the address information of the gift-receiver.

2. The gift transaction system according to claim 1, wherein the gifts are added to the gift board with a unique alphanumeric identifier.

3. The gift transaction system according to claim 2, wherein the gift-receiver is presented with the gift board with the unique alphanumeric identifier.

4. The gift transaction system according to claim 1, wherein the computing devices of the gift-receiver receive the alphanumeric code through a plurality of messaging platforms.

5. The gift transaction system according to claim 1, wherein the gift-receiver module is configured to enable the gift-receiver to send a personal message to the gift-giver.

6. A gift transaction method for creating a gift board of a plurality of gift brands by a gift-giver, and enabling a gift-receiver to select specific, bespoke brand items from the gift board, the method comprising steps of:
  providing, by one or more processors, access to a digital page of a gifting platform through one or more computing devices:
  presenting, by the one or more processors, a home page of the gifting platform upon receiving credentials from the gift-giver and initiating a step of creating the gift board upon receiving a request touch gesture;
  receiving, by the one or more processors, data of the gift-receiver and a gift amount from the gift-giver upon receiving the request touch gesture;
  presenting, by the one or more processors, the plurality of gifts on the gifting platform, wherein the plurality of gifts is associated with a plurality of brands and a plurality of categories across a plurality of vendors for gifting based on the received data pertaining to the gift-receiver;
  enabling, by the one or more processors, the gift-giver to select the one or more gifts from the plurality of gifts presented on the gifting platform;
  adding, by the one or more processors, the gifts to the gift board upon selection of the one or more gifts by the gift-giver:
  receiving, by the one or more processors, approval from the gift-giver for the gifts added to the gift board:
  receiving, by the one or more processors, contact information of the gift-receiver; and
  receiving, by the one or more processors, the gift amount from the gift-giver through one or more payment modes and receive a one-time passcode (OTP) to verify the payment;
  providing, by the one or more processors, access of the gift board to the gift-receiver upon receiving an alphanumeric code pertaining to the gift board received in the computing devices of the gift-receiver from an application server;
  opening, by the one or more processors, a vendor website of the brand selected by the gift-receiver in the gifting platform;
  superimposing, by the one or more processors, an icon on the vendor website inside the gifting platform, wherein the icon presents a toolbar comprising a shortlist interface, a gift amount, and a back to my gift board interface, wherein the shortlist interface displays the gifts selected by the gift-receiver, and the back to my gift board interface enables the gift-receiver to return to the gift board and continue the selection of the gifts from the gift board;
  enabling, by the one or more processors, the gift-receiver to place an order for the gifts displayed in the shortlist interface;
  presenting, by the one or more processors, an address page to receive the address information of the gift-receiver; and
  processing, by the one or more processors, the order upon receiving the address information of the gift-receiver.

7. The gift transaction method according to claim 6, wherein the gifts are added to the gift board with a unique alphanumeric identifier.

8. The gift transaction method according to claim 7, wherein the gift-receiver is presented with the gift board with the unique alphanumeric identifier.

9. The gift transaction method according to claim 6, wherein the computing devices of the gift-receiver receive the alphanumeric code through a plurality of messaging platforms.

10. The gift transaction method according to claim 6, wherein the gift-receiver module is configured to enable the gift-receiver to send a personal message to the gift-giver.

* * * * *